United States Patent
Ahmad et al.

(10) Patent No.: US 9,454,856 B2
(45) Date of Patent: Sep. 27, 2016

(54) LIQUEFIED PETROLEUM GAS TANK LEAK DETECTION SYSTEMS AND METHODS

(71) Applicant: GM Global Technology Operations LLC, Detroit, MI (US)

(72) Inventors: Farid Ahmad, Ajax (CA); John F. Larsen, Campbellcroft (CA); Karl H. Kozole, Oshawa (CA)

(73) Assignee: GM Global Technology Operations LLC, Detroit, MI (US)

( * ) Notice: Subject to any disclaimer, the term of this patent is extended or adjusted under 35 U.S.C. 154(b) by 146 days.

(21) Appl. No.: 14/159,897

(22) Filed: Jan. 21, 2014

(65) Prior Publication Data

US 2015/0206359 A1    Jul. 23, 2015

(51) Int. Cl.
*G07C 5/08* (2006.01)
*B60K 15/03* (2006.01)
*F02M 21/02* (2006.01)
*F02D 19/02* (2006.01)
*F02D 41/00* (2006.01)
*F02D 41/22* (2006.01)

(52) U.S. Cl.
CPC ........... *G07C 5/08* (2013.01); *B60K 15/03006* (2013.01); *F02D 19/025* (2013.01); *F02D 19/027* (2013.01); *F02M 21/0212* (2013.01); *F02M 21/0221* (2013.01); *B60K 2015/03013* (2013.01); *B60K 2015/03217* (2013.01); *F02D 41/0027* (2013.01); *F02D 2041/225* (2013.01); *Y02T 10/32* (2013.01)

(58) Field of Classification Search
CPC ............. B60K 15/03006; B60K 2015/03217; B60K 2015/03013; G07C 5/08; G01M 3/26; G01M 3/32; G01M 3/3236; G01M 3/3245; G01M 3/3254; G01M 3/3263; G01M 3/3272
See application file for complete search history.

(56) References Cited

U.S. PATENT DOCUMENTS

| | | | |
|---|---|---|---|
| 6,666,084 B2* | 12/2003 | Schelhas et al. | 73/290 R |
| 7,197,407 B2* | 3/2007 | Schimnowski et al. | 702/45 |
| 7,322,228 B2* | 1/2008 | Courrieu | 73/49.2 |
| 7,603,242 B2* | 10/2009 | Tichborne et al. | 702/51 |
| 9,064,401 B2* | 6/2015 | Grant | G08B 21/182 |
| 2008/0134776 A1* | 6/2008 | Zhou | G01F 23/18 73/291 |
| 2012/0150455 A1* | 6/2012 | Franklin et al. | 702/51 |
| 2015/0192450 A1* | 7/2015 | Leone | G01F 23/14 701/36 |

\* cited by examiner

Primary Examiner — Todd Melton

(57) ABSTRACT

A leak detection system of a vehicle includes a first minimum module, a first maximum module, a difference module, and a diagnostic module. The first minimum module, at a first time, determines a first minimum amount of liquefied petroleum gas (LPG) in an LPG tank based on a first level of LPG in the LPG tank. The first maximum module, at a second time after the first time, determines a first maximum amount of LPG in the LPG tank based on a second level of LPG in the LPG tank. The difference module determines a difference between the first minimum amount, the first maximum amount, and an amount of LPG consumed by an engine between the first and second times. The diagnostic module selectively indicates that a leak is present in the LPG tank based on the difference.

20 Claims, 4 Drawing Sheets

LIQUEFIED PETROLEUM GAS TANK LEAK DETECTION SYSTEMS AND METHODS

The present disclosure relates to internal combustion engines and more particularly to liquefied petroleum gas (LPG) vehicle control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into spark ignition internal combustion engines may be regulated via a throttle. The throttle may adjust throttle area, which increases or decreases air flow into the engine. As the throttle area increases, the air flow into the engine increases.

A fuel control system controls the rate that fuel is supplied to the engine to provide a desired air/fuel mixture to the cylinders. Increasing the amount of air and fuel provided to the cylinders generally increases the torque output of the engine. The fuel is stored in a fuel tank. In some applications a fuel pump may be used to propel fuel from the fuel tank and to pressurize the fuel system downstream of the tank. In other applications, a fuel vaporizer is used to convert liquid fuel to the gaseous state prior to injection. In those applications, the inherent pressure of the fuel tank may be sufficient to propel and pressurize the fuel without the use of a fuel pump. A fuel pressure regulator controls the pressure to the fuel rail and fuel injectors. Fuel injectors provide fuel to the engine from the fuel rail.

SUMMARY

A leak detection system of a vehicle includes a first minimum module, a first maximum module, a difference module, and a diagnostic module. The first minimum module, at a first time, determines a first minimum amount of liquefied petroleum gas (LPG) in an LPG tank based on a first level of LPG in the LPG tank. The first maximum module, at a second time after the first time, determines a first maximum amount of LPG in the LPG tank based on a second level of LPG in the LPG tank. The difference module determines a difference between the first minimum amount, the first maximum amount, and an amount of LPG consumed by an engine between the first and second times. The diagnostic module selectively indicates that a leak is present in the LPG tank based on the difference.

In further features, the diagnostic module indicates that a leak is present in the LPG tank when the difference is greater than a predetermined amount.

In still further features, the diagnostic module determines a rate based on the difference divided by a period between the first and second times and selectively indicates that a leak is present in the LPG tank based on the rate.

In yet further features, the diagnostic module indicates that a leak is present in the LPG tank when the rate is greater than a predetermined rate.

In further features, the difference module sets the difference equal to the first minimum amount minus the first maximum amount minus the amount of LPG consumed by the engine between the first and second times.

In still further features, an LPG consumption module tracks the amount of LPG consumed by the engine and resets the amount of LPG consumed by the engine to zero when the first minimum module determines the first minimum amount.

In yet further features, the first minimum module determines the first minimum amount of LPG in the LPG tank when a refueling event of the LPG tank is detected.

In further features a second minimum module, at the second time, determines a second minimum amount of LPG in the LPG tank based on the second level of LPG in the LPG tank. A second maximum module, at the first time, determines a second maximum amount of LPG in the LPG tank based on the first level of LPG in the LPG tank. A refueling event module detects the refueling event of the LPG tank when a difference between the second minimum amount and the second maximum amount is greater than a predetermined amount.

In still further features, the diagnostic module stores a predetermined diagnostic trouble code (DTC) in a computer readable medium when a leak is present in the LPG tank.

In yet further features, the diagnostic module illuminates a malfunction indicator lamp (MIL) when a leak is present in the LPG tank.

In further features, the diagnostic module displays a predetermined message on a display when a leak is present in the LPG tank.

A leak detection method for a vehicle includes: at a first time, determining a first minimum amount of liquefied petroleum gas (LPG) in an LPG tank based on a first level of LPG in the LPG tank; at a second time after the first time, determining a first maximum amount of LPG in the LPG tank based on a second level of LPG in the LPG tank; determining a difference between the first minimum amount, the first maximum amount, and an amount of LPG consumed by an engine between the first and second times; and selectively indicating that a leak is present in the LPG tank based on the difference.

In further features, the leak detection method further includes indicating that a leak is present in the LPG tank when the difference is greater than a predetermined amount.

In still further features, the leak detection method further includes: determining a rate based on the difference divided by a period between the first and second times; and selectively indicating that a leak is present in the LPG tank based on the rate.

In yet further features, the leak detection method further includes indicating that a leak is present in the LPG tank when the rate is greater than a predetermined rate.

In further features, the leak detection method further includes setting the difference equal to the first minimum amount minus the first maximum amount minus the amount of LPG consumed by the engine between the first and second times.

In still further features, the leak detection method further includes: tracking the amount of LPG consumed by the engine; and resetting the amount of LPG consumed by the engine to zero when the first minimum amount is determined.

In yet further features, the leak detection method further includes determining the first minimum amount of LPG in the LPG tank when a refueling event of the LPG tank is detected.

In further features, the leak detection method further includes: at the second time, determining a second minimum amount of LPG in the LPG tank based on the second level of LPG in the LPG tank; at the first time, determining a second maximum amount of LPG in the LPG tank based on the first level of LPG in the LPG tank; and detecting the refueling event of the LPG tank when a difference between the second minimum amount and the second maximum amount is greater than a predetermined amount.

In yet further features, the leak detection method further includes, when a leak is present in the LPG tank, at least one of: storing a predetermined diagnostic trouble code (DTC) in a computer readable medium; illuminating a malfunction indicator lamp (MIL); and displaying a predetermined message on a display.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A fuel system supplies liquid petroleum gas (LPG) to an engine for combustion. An LPG pump draws LPG from an LPG tank and provides LPG in liquid form to a fuel rail. In various implementations, liquid LPG may be provided to an LPG vaporizer. A fuel pump may be used to propel liquid LPG from the fuel tank to the LPG vaporizer. In various implementations, pressure within the LPG tank may be sufficient to propel liquid fuel to the LPG vaporizer without the need for a pump. The LPG vaporizer provides LPG in vapor form to a fuel rail. Fuel injectors supply LPG from the fuel rail to the engine.

A leak detection module of the present disclosure determines whether the LPG tank has a leak based on a pressure within the LPG tank and a level of liquid LPG in the LPG tank. More specifically, at a first time, the leak detection module determines a first minimum mass of the LPG in the LPG tank and a first maximum mass of the LPG in the LPG tank. The actual mass of LPG in the LPG tank at the first time may be between the first minimum mass and the first maximum mass, inclusive. Later, at a second time, the leak detection module determines a second minimum mass of the LPG in the LPG tank and a second maximum mass of the LPG in the LPG tank. The actual mass of LPG in the LPG tank at the second time may be between the second minimum mass and the second maximum mass, inclusive.

The leak detection module determines a difference between the first minimum mass, the second maximum mass, and an amount of LPG consumed by the engine between the first and second times. The leak detection module may indicate that no leak is present when the difference is less than a predetermined amount. The leak detection module may indicate that a leak is present in the LPG tank when the difference is greater than the predetermined amount. In various implementations, the leak detection module may determine whether a leak is present based on the difference over the period between the first and second times. For example, the leak detection module may indicate that no leak is present when the difference over the period is less than a predetermined rate. The leak detection module may indicate that a leak is present in the LPG tank when the difference over the period is greater than the predetermined rate.

Figure 1:
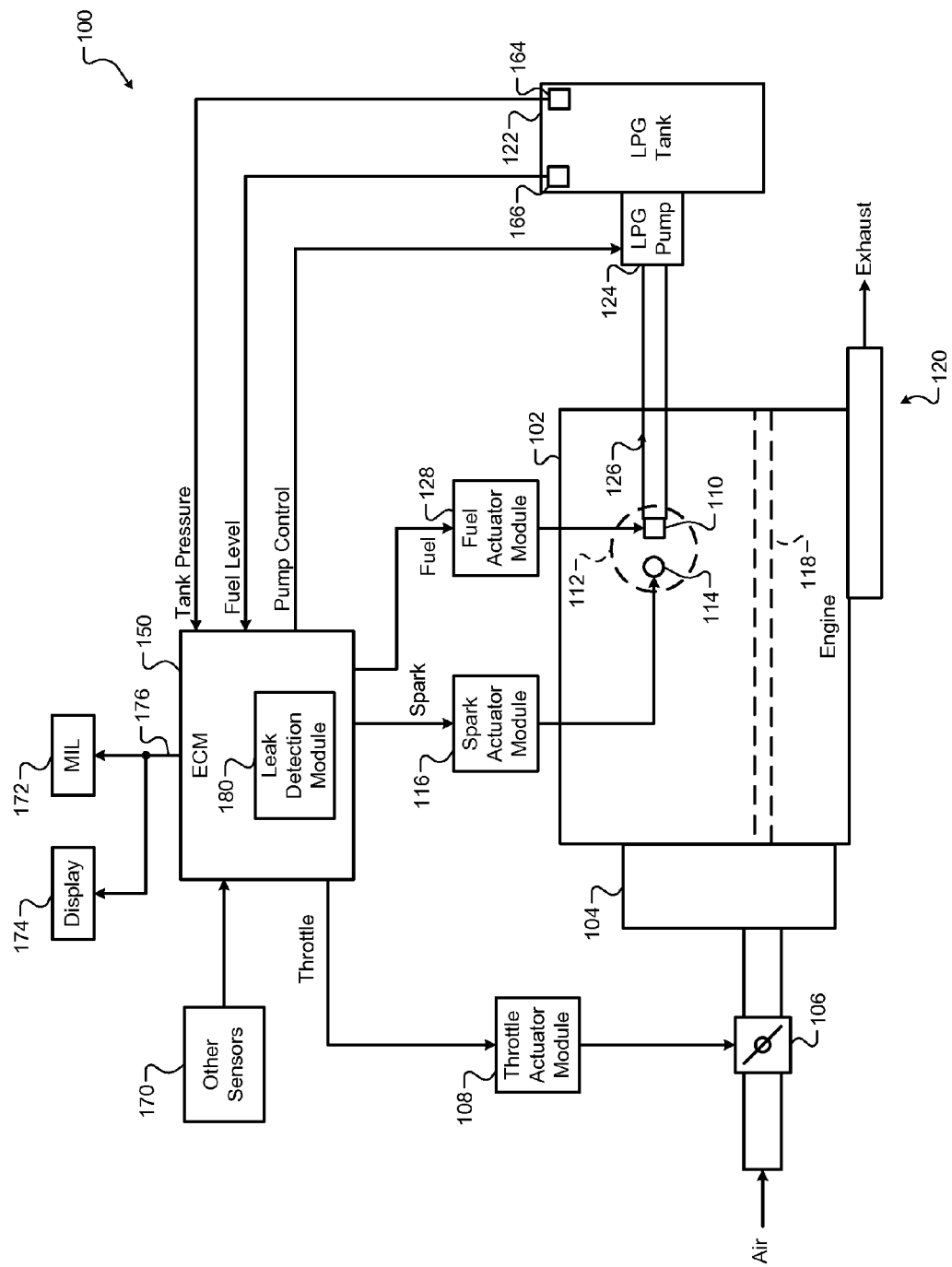
FIG. 1 is a functional block diagram of an example engine system of an liquefied petroleum gas (LPG) vehicle according to the present disclosure.

Referring now to FIG. 1, a functional block diagram of an example engine system 100 of a liquefied petroleum gas (LPG) vehicle is presented. Air is drawn into an engine 102 through an intake manifold 104. A throttle valve 106 may be actuated by a throttle actuator module 108 to vary airflow into the engine 102. The throttle actuator module 108 may include, for example, an electronic throttle controller (ETC). The air mixes with LPG injected by one or more fuel injectors, such as a fuel injector 110, to form an air/LPG mixture. The air/LPG mixture is combusted within one or more cylinders of the engine 102, such as a cylinder 112. In the alternative, an LPG vaporizer may be used to create LPG in vapor form and pressure of vapor LPG may be used to provide LPG in vapor form to the fuel rail.

A spark plug 114 may initiate combustion of the air/LPG mixture within the cylinder 112. A spark actuator module 116 controls the provision of spark by the spark plug 114. Although one fuel injector, spark plug, and cylinder are shown, the engine 102 may include more or fewer fuel injectors, spark plugs, and cylinders. For example only, the engine 102 may include 2, 3, 4, 5, 6, 8, 10, or 12 cylinders. A fuel injector and a spark plug may be provided for each cylinder of the engine 102. Drive torque generated by combustion of the air/LPG mixture is output from the engine 102 via a crankshaft 118. Exhaust gas resulting from combustion is expelled from the engine 102 to an exhaust system 120.

Before being provided to the engine 102, the LPG is stored in an LPG tank 122. An LPG pump 124 draws LPG from the LPG tank 122. The LPG pump 124 pressurizes the LPG within a fuel rail 126. The fuel rail 126 supplies pressurized LPG to the fuel injector 110. A fuel actuator module 128 controls opening of the fuel injector 110 based on signals from an engine control module (ECM) 150. In this manner, the ECM 150 controls the timing of LPG injection and the amount of LPG injected by the fuel injector 110. The ECM 150 also controls other engine actuators, such as the throttle actuator module 108 and the spark actuator module 116.

One or more sensors may be implemented in the engine system 100. For example only, the engine system 100 may include a tank pressure sensor 164 and a fuel level sensor 166. The tank pressure sensor 164 measures a pressure within the LPG tank 122 ("tank pressure") and generates a tank pressure signal based on the tank pressure. The fuel level sensor 166 measures a level of the (liquid) LPG in the LPG tank 122 ("LPG level") and generates a fuel level signal based on the LPG level. The engine system 100 may also include other sensors 170, such as a mass air flowrate (MAF) sensor, a manifold absolute pressure (MAP) sensor, an intake air temperature (IAT) sensor, an engine speed sensor, and other suitable sensors.

The ECM 150 includes a leak detection module 180 that determines whether the LPG tank 122 has a leak. More specifically, the leak detection module 180 determines a first amount (e.g., mass) of LPG that may be present within the LPG tank 122 at a first time. The leak detection module 180 determines a second amount of LPG that may be present within the LPG tank 122 at a second time. When a difference between the first minimum amount, the second maximum amount, and an amount of LPG consumed between the first and second times is greater than the predetermined leak amount, the leak detection module 180 diagnoses a leak in the LPG tank 122.

The leak detection module 180 may take one or more remedial actions 176 when a leak is present. For example, the leak detection module 180 may store a predetermined diagnostic trouble code (DTC) associated with a leak in the LPG tank 122 in memory, illuminate a malfunction indicator lamp (MIL) 172, and/or display a message on a display 174. While the leak detection module 180 is shown and described herein as being implemented within the ECM 150, the leak detection module 180 may be implemented in another suitable location and/or independently.

Figure 2:
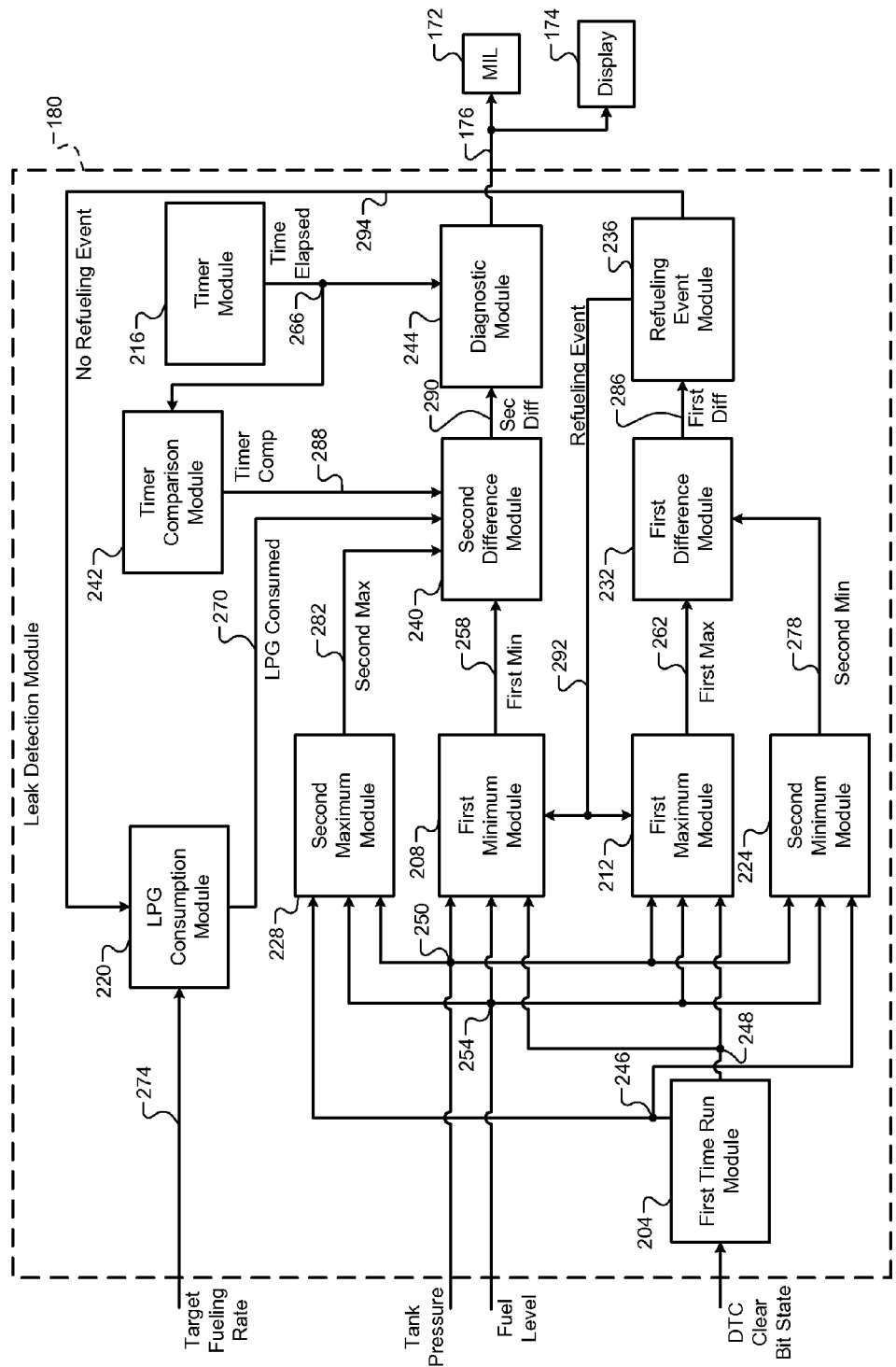
FIG. 2 is a functional block diagram of an example leak detection system for an LPG vehicle according to the present disclosure.

Referring now to FIG. 2, a functional block diagram of an example implementation of the leak detection module 180 is presented. The leak detection module 180 includes a triggering module 204, a first minimum module 208, a first maximum module 212, a timer module 216, an LPG consumption module 220, a second minimum module 224, a second maximum module 228, a first difference module 232, a refueling event module 236, a second difference module 240, and a diagnostic module 244.

The triggering module 204 generates a trigger signal 246 indicating whether first minimum and maximum amounts of LPG in the LPG tank 122 should be determined. For example, the triggering module 204 may generate the trigger signal 246 when stored diagnostic data has been cleared, during a first startup of the vehicle, when stored diagnostic has been corrupted, and/or when stored diagnostic data has been reset (e.g., during vehicle servicing). The triggering module 204 may also generate the trigger signal 246 when a refueling event has occurred and/or when one or more other suitable conditions occur. Detection of refueling events is discussed further below.

The first minimum module 208 determines a first minimum amount 258 (e.g., mass) of LPG in the LPG tank 122 based on a fuel level 254 when the trigger signal 246 is generated. The first minimum module 208 may determine the first minimum amount 258 further based on a tank pressure 250. The first minimum amount 258 corresponds to a minimum amount of LPG that may be in the LPG tank 122 under the current conditions. The tank pressure 250 may be measured using the tank pressure sensor 164. The fuel level 254 may be measured using the fuel level sensor 166. For example only, the first minimum module 208 may determine the first minimum amount 258 using one or more functions and/or mappings that relate the tank pressure 250 and/or the fuel level 254 to the first minimum amount 258. In various implementations, composition of the fuel (e.g., % butane and % propane) may also be used. In various other implementations, temperature of the fuel may be measured using a fuel temperature sensor and used to determine the first minimum amount 258.

The first maximum module 212 determines a first maximum amount 262 (e.g., mass) of LPG in the LPG tank 122 based on the fuel level 254 when the trigger signal 246 is generated. The first maximum module 212 may determine the first maximum amount 262 further based on the tank pressure 250. The first maximum amount 262 corresponds to a maximum amount of LPG that may be in the LPG tank 122 under the current conditions. For example only, the first maximum module 212 may determine the first maximum amount 262 using one or more functions and/or mappings that relate the tank pressure 250 and/or the fuel level 254 to the first maximum amount 262. In various implementations, composition of the fuel (e.g., % butane and % propane) may also be used. In various other implementations, temperature of the fuel may be measured using a fuel temperature sensor and used to determine the first maximum amount 262.

The timer module 216 resets a period elapsed 266 when the trigger signal 246 is generated. The timer module 216 increases the period elapsed 266 as time passes. This includes time when the engine 102 is running and may also include time while the engine 102 is not running. In this manner, the period elapsed 266 tracks the period between when the first minimum and maximum modules 208 and 212 determined the first minimum and maximum amounts 258 and 262, respectively, and a present time.

The LPG consumption module 220 resets an amount of LPG consumed 270 (e.g., mass) when the trigger signal 246 is generated. The LPG consumption module 220 increases the amount of LPG consumed 270 as the engine 102 consumes LPG. In this manner, the amount of LPG consumed 270 tracks an amount of LPG consumed since the first minimum and maximum modules 208 and 212 determines the first and second minimum and maximum amounts 258 and 262, respectively.

For example, the fuel actuator module 128 may control LPG injection based on a target fueling rate 274 (e.g., grams/second (g/s)). The LPG consumption module 220 may integrate the target fueling rate 274 every predetermined period to determine a mass of LPG consumed and add the mass of LPG consumed to the amount of LPG consumed 270.

The second minimum and maximum modules 224 and 228 determine second minimum and maximum amounts 278 and 282 (e.g., masses), respectively, every predetermined period. The second minimum module 224 determines a second minimum amount 278 (e.g., mass) of LPG in the LPG tank 122 based on the fuel level 254. The second minimum module 224 may determine the second minimum amount 278 further based on the tank pressure 250. The second minimum amount 278 corresponds to a minimum amount of LPG that may be in the LPG tank 122 under the current conditions. For example only, the second minimum module 224 may determine the second minimum amount 278 using one or more functions and/or mappings that relate the tank pressure 250 and/or the fuel level 254 to the second minimum amount 278. In various implementations, composition of the fuel (e.g., % butane and % propane) may also be used. In various other implementations, temperature of the fuel may be measured using a fuel temperature sensor and used to determine the second minimum amount 278.

The second maximum module 228 determines a second maximum amount 282 (e.g., mass) of LPG in the LPG tank 122 based on the fuel level 254. The second maximum module 228 may determine the second maximum amount 282 further based on the tank pressure 250. The second maximum amount 282 corresponds to a maximum amount of LPG that may be in the LPG tank 122 under the current conditions. For example only, the second maximum module 228 may determine the second maximum amount 282 using one or more functions and/or mappings that relate the tank pressure 250 and/or the fuel level 254 to the second maximum amount 282. In various implementations, composition of the fuel (e.g., % butane and % propane) may also be used. In various other implementations, temperature of the fuel may be measured using a fuel temperature sensor and used to determine the second maximum amount 282.

The first difference module 232 determines a first difference 286 based on a difference between the second minimum amount 278 and the first maximum amount 262. For example only, the first difference module 232 may set the first difference 286 equal to the second minimum amount 278 minus the first maximum amount 262.

The refueling event module 236 determines whether a refueling event has occurred based on the first difference 286. For example, the refueling event module 236 may indicate that a refueling event has not occurred when the first difference 286 is less than a predetermined refueling amount (e.g., mass). The refueling event module 236 may indicate that a refueling event has occurred when the first difference 286 is greater than the predetermined refueling amount.

When the period elapsed 266 is greater than a predetermined period, the second difference module 240 determines a second difference 290. The second difference module 240 determines the second difference 290 based on a difference between the first minimum amount 258, the second maximum amount 282, and the amount of LPG consumed 270. For example only, the second difference module 240 may set the second difference 290 equal to the first minimum amount 258 minus the second maximum amount 282 and the amount of LPG consumed 270.

When the period elapsed 266 is greater than the predetermined period, the diagnostic module 244 determines whether a leak is present in the LPG tank 122 based the second difference 290. For example, the diagnostic module 244 may indicate that no leak is present in the LPG tank 122 when the second difference 290 is less than a predetermined leak amount (e.g., mass). The diagnostic module 244 may indicate that a leak is present in the LPG tank 122 when the second difference 290 is greater than the predetermined leak amount.

In various implementations, the diagnostic module 244 may determine a rate based on the second difference 290 divided by the period elapsed 266 and determine whether a leak is present in the LPG tank 122 based on the rate. For example, the diagnostic module 244 may indicate that no leak is present in the LPG tank 122 when the rate (i.e., the second difference 290 divided by the period elapsed 266) is less than a predetermined rate of change (e.g., mass/second). The diagnostic module 244 may indicate that a leak is present in the LPG tank 122 when the rate (i.e., the second difference 290 divided by the period elapsed 266) is greater than the predetermined rate of change.

The diagnostic module 244 may take one or more remedial actions 176 when a leak is present in the LPG tank 122. For example, the diagnostic module 244 may store a predetermined DTC associated with a leak in the LPG tank 122 in memory, illuminate the MIL 172, and/or display a message on the display 174.

Figure 3:
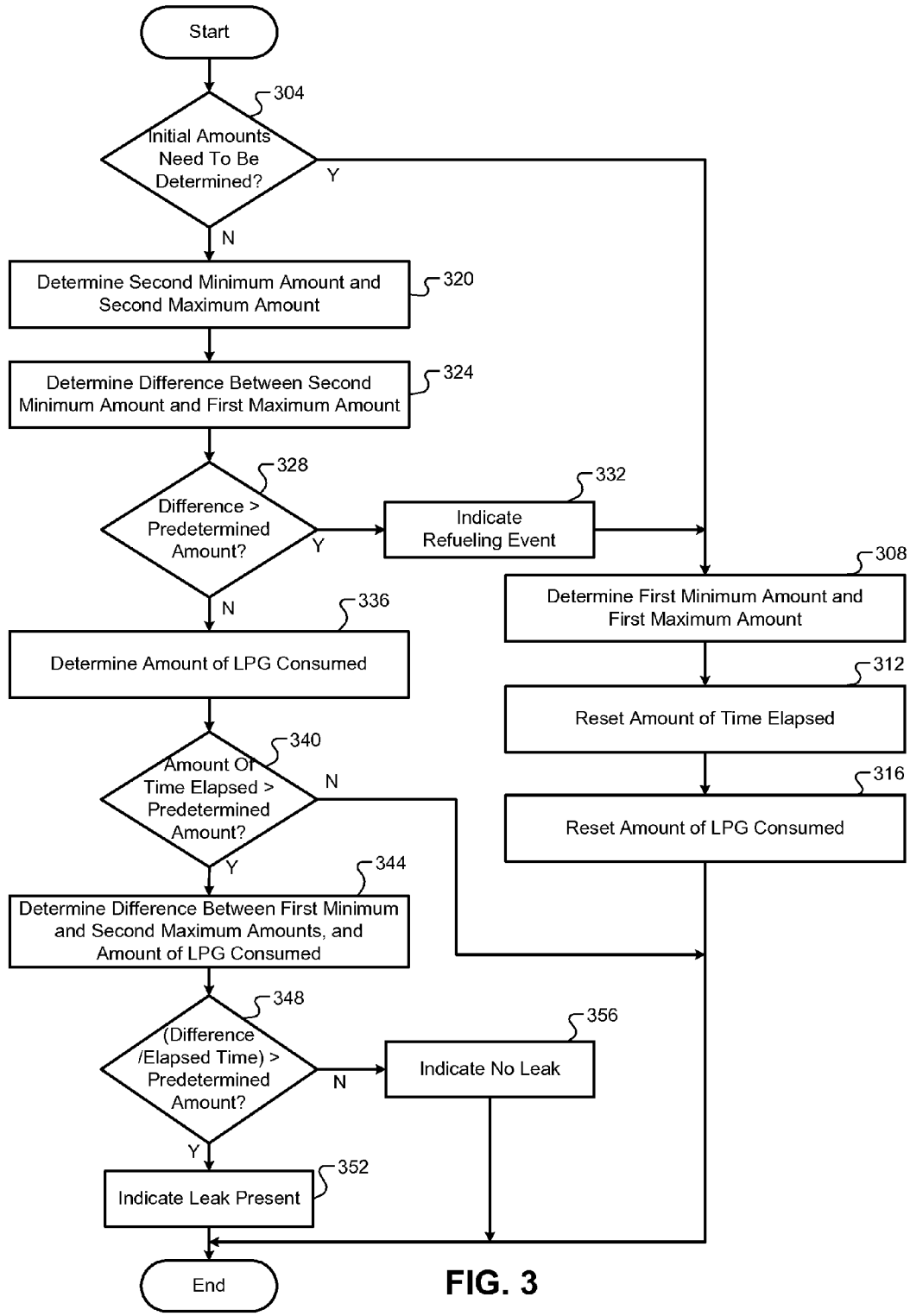
FIG. 3 is a flowchart depicting an example method of determining whether a leak is present in an LPG tank according to the present disclosure.

Referring now to FIG. 3, a flowchart depicting an example method of determining whether the LPG tank 122 has a leak. Control may begin with 304 where the triggering module 204 determines whether the first minimum amount 258 and the first maximum amount 262 should be determined. If 304 is true, the triggering module 204 generates the trigger signal 246, and control continues with 308. If 304 is false, control continues with 320, which is discussed further below.

The first minimum and maximum modules 208 and 212 determine the first minimum and maximum amounts 258 and 262, respectively, at 308. The first minimum and maximum modules 208 and 212 determine the first minimum and maximum amounts 258 and 262, respectfully, based on the fuel level 254 at that time. The first minimum and maximum modules 208 and 212 may determine the first minimum and maximum amounts 258 and 262 further based on the tank pressure 250. Control continues with 312 after 308.

The timer module 216 resets the period elapsed 266 at 312. The timer module 216 updates the period elapsed 266 as time passes. Control continues with 316. The LPG consumption module 220 resets the amount of LPG consumed 270 at 316.

Referring back to 320 (i.e., when 304 is false), the second minimum and maximum modules 224 and 228 determine the second minimum and maximum amounts 278 and 282, respectively, at 320. The second minimum and maximum modules 224 and 228 determine the second minimum and maximum amounts 278 and 282, respectively, at 320 based on the fuel level 254 at that time. The second minimum and maximum modules 224 and 228 may determine the second minimum and maximum amounts 278 and 282 further based on the tank pressure 250.

The first difference module 232 determines the first difference 286 between the second minimum amount 278 and the first maximum amount 262 at 324. The refueling event module 236 determines whether the first difference 286 is greater than the predetermined leak amount at 328. If 328 is true, the refueling event module 236 indicates that a refueling event has occurred at 332, and control continues with 308-316, as discussed above. If 328 is false, control continues with 336. The LPG consumption module 220 updates the amount of LPG consumed 270 at 336, for example, based on the target fueling rate 274.

At 340, the second difference module 240 determines whether the period elapsed 266 is greater than the predetermined period. If 340 is false, control may end. If 340 is true, the second difference module 240 determines the second difference 290 based on the first minimum amount 258, the second maximum amount 282, and the amount of LPG consumed 270 at 344.

At 348, the diagnostic module 244 may determine whether the second difference 290 is greater than the predetermined leak amount. In various implementations, the diagnostic module 244 may determine whether second difference 290 divided by the period elapsed 266 is greater than the predetermined rate at 348. If 348 is true, the diagnostic module 244 indicates that a leak is present in the LPG tank 122 at 352. If 348 is false, the diagnostic module 244 indicates no leak is present in the LPG tank 122 at 356. While control is shown as ending after 316, 352, or 356, FIG. 3 is illustrative of one control loop, and control may return to 304. Control loops may be performed at a predetermined rate.

Figure 4:
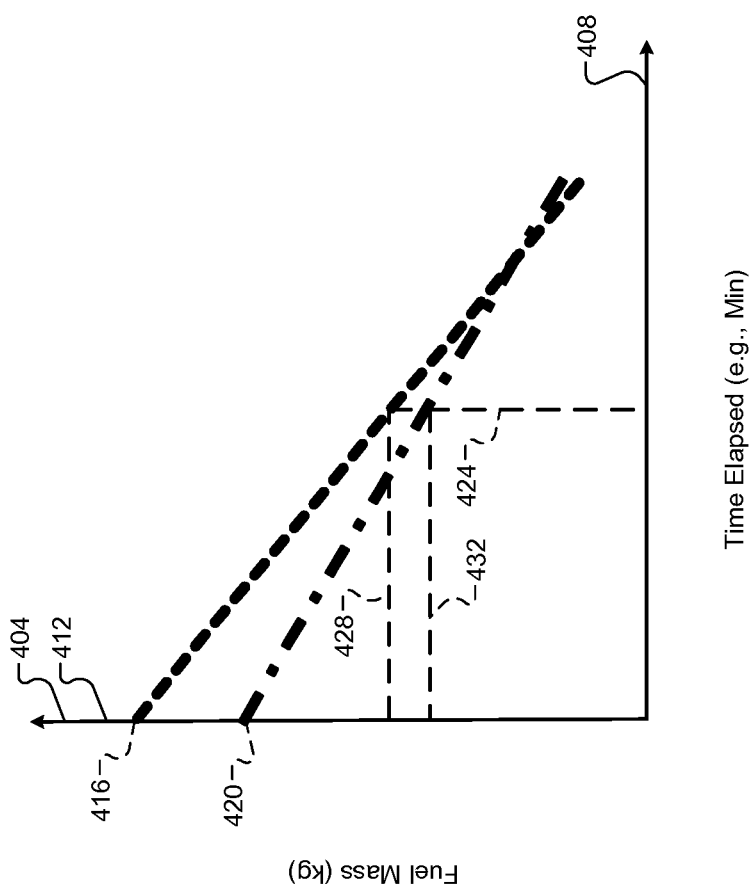
FIG. 4 is an example graph of fuel mass versus time according to the present disclosure.

Referring now to FIG. 4, an example graph of a fuel mass 404 versus time 408 is presented. At a first time 412 (time zero), the mass of LPG in the LPG tank 122 may be between a first maximum mass 416 and a first minimum mass 420, depending on the composition of the LPG, pressure, and temperature within the LPG tank 122, and other parameters. The fuel mass 404 may decrease as LPG is consumed by the engine 102.

At a second time 424, the fuel mass of LPG in the LPG tank 122 may be between a second maximum mass 428 and a second minimum mass 432. A difference between the first minimum mass 420, the second maximum mass 428, and an amount of LPG consumed 270 divided by the period elapsed 266 between the first and second times being greater than a predetermined rate may be indicative of a leak in the LPG tank 122.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A leak detection system of a vehicle, comprising:
   a first minimum module that, at a first time, determines a first minimum possible amount of liquefied petroleum gas (LPG) that may be in an LPG tank based on a first level of LPG in the LPG tank;
   a first maximum module that, at a second time after the first time, determines a first maximum possible amount of LPG that may be in the LPG tank based on a second level of LPG in the LPG tank;
   a difference module that determines a difference between the first minimum possible amount, the first maximum possible amount, and an amount of LPG consumed by an engine between the first and second times; and
   a diagnostic module that selectively indicates that a leak is present in the LPG tank based on the difference.

2. The leak detection system of claim 1 wherein the diagnostic module indicates that a leak is present in the LPG tank when the difference is greater than a predetermined amount.

3. The leak detection system of claim 1 wherein the diagnostic module determines a rate based on the difference divided by a period between the first and second times and selectively indicates that a leak is present in the LPG tank based on the rate.

4. The leak detection system of claim 3 wherein the diagnostic module indicates that a leak is present in the LPG tank when the rate is greater than a predetermined rate.

5. The leak detection system of claim 1 wherein the difference module sets the difference equal to the first minimum possible amount minus the first maximum possible amount minus the amount of LPG consumed by the engine between the first and second times.

6. The leak detection system of claim 1 further comprising an LPG consumption module that tracks the amount of LPG consumed by the engine and that resets the amount of LPG consumed by the engine to zero when the first minimum module determines the first minimum possible amount.

7. The leak detection system of claim 1 wherein the first minimum module determines the first minimum possible amount of LPG in the LPG tank when a refueling event of the LPG tank is detected.

8. The leak detection system of claim 7 further comprising:
   a second minimum module that, at the second time, determines a second minimum possible amount of LPG that may be in the LPG tank based on the second level of LPG in the LPG tank;
   a second maximum module that, at the first time, determines a second maximum possible amount of LPG that may be in the LPG tank based on the first level of LPG in the LPG tank; and
   a refueling event module that detects the refueling event of the LPG tank when a difference between the second minimum possible amount and the second maximum possible amount is greater than a predetermined amount.

9. The leak detection system of claim 1 wherein the diagnostic module stores a predetermined diagnostic trouble code (DTC) in a computer readable medium when a leak is present in the LPG tank.

10. The leak detection system of claim 1 wherein the diagnostic module illuminates a malfunction indicator lamp (MIL) when a leak is present in the LPG tank.

11. The leak detection system of claim 1 wherein the diagnostic module displays a predetermined message on a display when a leak is present in the LPG tank.

12. A leak detection method for a vehicle, comprising:
   at a first time, determining a first minimum possible amount of liquefied petroleum gas (LPG) that may be in an LPG tank based on a first level of LPG in the LPG tank;
   at a second time after the first time, determining a first maximum possible amount of LPG that may be in the LPG tank based on a second level of LPG in the LPG tank;

determining a difference between the first minimum possible amount, the first maximum possible amount, and an amount of LPG consumed by an engine between the first and second times; and selectively indicating that a leak is present in the LPG tank based on the difference.

13. The leak detection method of claim 12 further comprising indicating that a leak is present in the LPG tank when the difference is greater than a predetermined amount.

14. The leak detection method of claim 12 further comprising:

determining a rate based on the difference divided by a period between the first and second times; and selectively indicating that a leak is present in the LPG tank based on the rate.

15. The leak detection method of claim 14 further comprising indicating that a leak is present in the LPG tank when the rate is greater than a predetermined rate.

16. The leak detection method of claim 12 further comprising setting the difference equal to the first minimum possible amount minus the first maximum possible amount minus the amount of LPG consumed by the engine between the first and second times.

17. The leak detection method of claim 12 further comprising:

tracking the amount of LPG consumed by the engine; and resetting the amount of LPG consumed by the engine to zero when the first minimum possible amount is determined.

18. The leak detection method of claim 12 further comprising determining the first minimum possible amount of LPG in the LPG tank when a refueling event of the LPG tank is detected.

19. The leak detection method of claim 18 further comprising:

at the second time, determining a second minimum possible amount of LPG in the LPG tank based on the second level of LPG in the LPG tank;

at the first time, determining a second maximum possible amount of LPG in the LPG tank based on the first level of LPG in the LPG tank; and detecting the refueling event of the LPG tank when a difference between the second minimum possible amount and the second maximum possible amount is greater than a predetermined amount.

20. The leak detection method of claim 12 further comprising, when a leak is present in the LPG tank, at least one of:

storing a predetermined diagnostic trouble code (DTC) in a computer readable medium;

illuminating a malfunction indicator lamp (MIL); and displaying a predetermined message on a display.

* * * * *